April 8, 1969  H. A. BRYAN ET AL  3,437,124
FALLING FILM HEAT EXCHANGER
Filed July 21, 1967

INVENTOR/S
HARRY A. BRYAN &
JOSEPH C. REYNOLDS,

BY *Melville, Strasser, Foster and Hoffman*
ATTORNEYS

United States Patent Office 3,437,124
Patented Apr. 8, 1969

3,437,124
FALLING FILM HEAT EXCHANGER
Harry A. Bryan and Joseph C. Reynolds, Louisville, Ky., assignors to Girdler Corporation, Louisville, Ky., a corporation of Ohio
Filed July 21, 1967, Ser. No. 655,232
Int. Cl. B01d 1/06; F28d 7/00
U.S. Cl. 159—13                8 Claims

ABSTRACT OF THE DISCLOSURE

Apparatus for controlling the distribution of liquid to the tubes of a falling film heat exchanger. The tops of the tubes or ferrules attached thereto have secantal or radial slots for the admission of liquid, and rotatable sleeves having saw-tooth upper edges surround the tube tops or ferrules; rotation of the sleeves varies the length of the slots exposed above the saw-tooth edges through which liquid can enter. Each tube is thus individually adjustable after installation.

Background of the invention

This invention relates to falling film heat exchanger of the type used for drying aqueous solutions of ammonium nitrate, urea and like chemical solutions. The heat exchanger comprises a plurality of vertical tubes supported by top and bottom tube sheets, with the inlets to the tubes extending above the top tube sheet. The solution to be dried is introduced above the top tube sheet and flows across the face thereof. The top of each tube or a ferrule attached thereto has openings therein which control the amount of solution entering each tube. The solution entering the tube forms a thin film along the inside surface of the tube, while a medium with low moisture content such as heated dry air is introduced into the bottom of each tube and flows upwardly countercurrent to the solution. A heating medium such as steam is applied to the outside surfaces of the tubes below the top tube sheet. The water is thus flashed out of the solution within the tubes and is carried out of the tops of the tubes by the countercurrent flow of heated air.

Several tube tops or ferrule designs are currently used in order to control the amount of solution entering each tube, such as screen ferrules, ferrules or tube tops with secantal or radial slots, and similar types. In ferrules and tube tops of this type, liquid distribution is dependent on the depth of liquid above the bottom of the screen or the bottom of the slot.

United States Patent No. 3,087,533, issued Apr. 30, 1963, to J. L. Graumann et al., and No. 2,519,618 issued Aug. 22, 1950, to J. G. Wilson et al., disclose falling film heat exchangers having liquid distribution control means of the type described above. United States Patent No. 3,203,466, issued Apr. 31, 1965, to A. W. Eckstrom discloses a falling film heat exchanger having a horizontal baffle above the vertical tubes which is adjustable vertically so as to control the velocity of the gases rising through the tubes and to direct these gases radially outwardly. The velocity of the gases passing into down-take tubes controls the amount of liquid flowing into these tubes.

The falling film heat exchanger disclosed in Graumann et al. provides a cylindrical ferrule over the outer periphery of each tube, each ferrule having a plurality of axially extending slots which are secantly disposed with respect to the cylindrical wall of the ferrule. After seating the ferrules are machined so as to make the effective lower ends of the slots uniform throughout the ferrules.

It is apparent that the depth of liquid flowing over the tube sheet will decrease as the solution flows past a row of tubes, and the depth will be the least of the farthest distance from the point of origin of the liquid supply. Therefore, the tubes closest to the point of liquid supply will admit the largest amount of solution through the slots, while the tubes farthest from the point of supply will admit the least amount of solution. This disadvantage prevails regardless of accurate machining to ensure that the bottoms of the slots in each ferrule are the same distance above the tube sheet. In the cylindrical array of vertical tubes there is thus a liquid gradient from the outside of the tube bundle to the center of the tube bundle, and the flow of liquid down each tube thus becomes progressively less toward the center of the tube bundle.

If the liquid distribution to each tube is not approximately equal, the solution leaving the bottoms of the tubes varies in moisture content. Some tubes will deliver solution drier than desired while some tubes will deliver solution wetter than desired. As the required moisture content approaches 0%, the distribution becomes more critical. It becomes extremely difficult for the varying moistures from all the tubes to reach the average low moisture requirement under such conditions.

In drying aqueous solutions of ammonium nitrate and urea, the moisture content must be reduced to less than 0.5% in order to permit proper prilling or granulating in subsequent operations. As the concentration increases, the melting point rises, thus requiring higher operating temperatures. If residence time at these higher temperatures is too great, decomposition will occur. In the case of urea, an undesirable by-product, biuret, is formed, the quantity being directly proportional to the temperature and residence time.

In falling film heat exchangers of the type disclosed in the prior art, corrective measures generally could be taken only after the unit proved unsatisfactory after being put into operation. A redesigning or remachining of the ferrules or tube tops can effect equal liquid distribution to all tubes, but it is evident that this would require substantial down time and additional expense after the unit had been put into operation.

Summary of the invention

The present invention provides means to ensure equal distribution of liquid to all tubes which is readily adjustable both before and after the unit has been put into operation.

The liquid distribution control means of the invention comprises a rotatable sleeve which surrounds the inlet openings of each tube top or ferrule, the upper edges of the sleeve being angularly disposed relative to the axis of the tube whereby rotation of the sleeve varies the area of each inlet opening exposed for admission of liquid by changing the height of the effective lower edge of the opening above the tube sheet.

Application of the teachings of the instant invention provides the following advantages:

The tube end and the inlet slots therein (or in the ferrules) can be machined before assembly and installation. The bottoms of the slots need not be positioned at exactly the same height above the tube sheet since the upper edges of the sleeves determine the effective bottoms of the slots.

The settings of the sleeves can be adjusted from tube row to tube row to compensate for the liquid gradient between tube rows.

The running liquid depth on the tube sheet can be decreased. Hence the time during which the liquid is exposed to elevated temperatures is decreased, which of course minimizes undesirable decomposition.

The setting of the sleeves can be adjusted in the field, if the original setting proves improper, with a minimum of down time and at negligible expense.

The operable range of the unit is broadened by adjustment of the sleeves. At maximum output the maldistribution of the tubes becomes more pronounced if the effective bottom edges of the inlet openings cannot be varied to compensate for the greater liquid gradient.

It is a principal object of the invention to provide apparatus for controlling the distribution of liquid to the tubes having the meritorious features and advantages set forth above.

*Brief description of the drawings*

Reference is made to the accompanying drawings in which.

*Description of the preferred embodiment*

Figure 1:
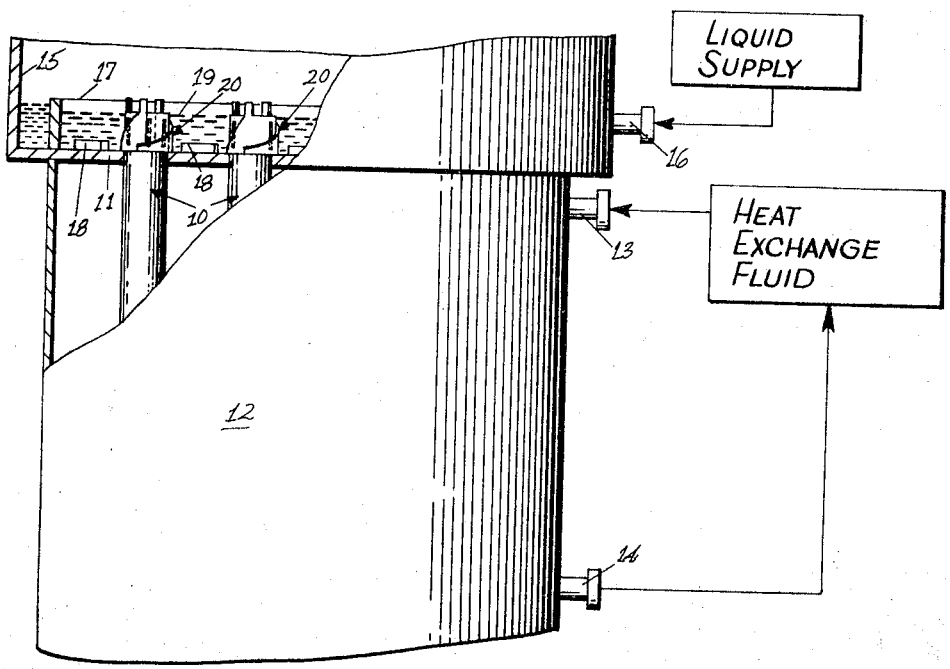
FIGURE 1 is a fragmentary elevational view of a falling film heat exchanger in partial section embodying the present invention.

The general construction and manner of operation of the falling film heat exchanger is set forth in detail in the above mentioned U.S. Patent 3,087,533 and is not repeated herein since these details form no part of the present invention. It should suffice to explain with reference to FIG. 1 that a plurality of vertical tubes indicated generally at 10 are supported on top tube sheet 11 and a bottom tube sheet (not shown). The tubes are enclosed within the shell 12 into which steam or other heating medium is introduced through inlet 13 and withdrawn through outlet 14.

A cylindrical wall 15 forms a distribution chamber which is provided with a liquid supply inlet 16 for introduction of the aqueous ammonium nitrate, urea or other chemical solution to be dried. A weir 17 concentric with the outer wall 15 and spaced inwardly therefrom surrounds the tubes and separates them from direct contact with the liquid supply inlet 16. A plurality of apertures 18 spaced uniformly about the bottom of the weir 17 introduces liquid into the tube portion of the distribution chamber below the surface 19 of the liquid, thus reducing turbulence.

Figure 2:
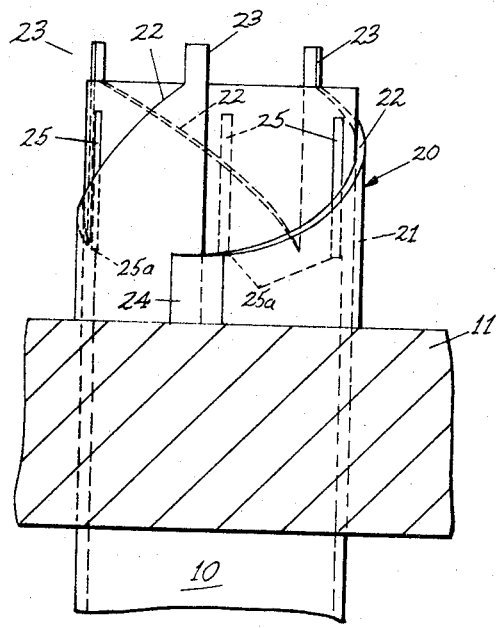
FIGURE 2 is an enlarged side elevation of an exemplary liquid distribution control means of the present invention.
Figure 3:
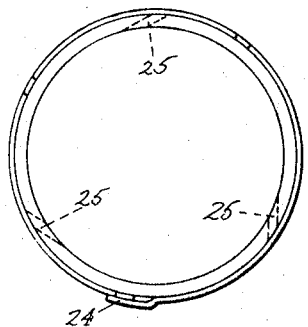
FIGURE 3 is a top plan view of the liquid distribution control means of FIG. 2.

At the top of each tube 10 the liquid distribution control means of the present invention is indicated generally at 20. As best seen in FIGS. 2 and 3, the top of each tube 10 is provided with a plurality of vertically elongated slots 25, which are shown as being secantal to the tube, it being understood that the slots may also be radial or tangential. The bottom of each slot terminates above the tube sheet 11 at 25a.

A sleeve 21 surrounds the top of each tube in such manner that the top outlet of each tube is unobstructed. In the embodiment of FIGS. 1–3, each sleeve has a number of saw-tooth upper edges 22, the number preferably being equal to the number of slots 25. Preferably each saw-tooth edge terminates in an upwardly projecting tab 23 for convenience in rotating the sleeve with respect to the tube.

The sleeve 21 is formed to fit snugly around the top of the tube, and means is provided to hold the sleeve in its desired adjustment so as to prevent rotation during operation. This can conveniently be effected by forming the tube of metal having a spring action, as shown at 24, thereby assuring a tight fit. Alternatively the sleeve could be formed of an elastomeric material requiring a press fit. The use of clamps, set screws, and/or a threaded fit is also within the scope of the invention.

It will be apparent that rotation of the sleeve around the tube varies the length of the slot 25 above the saw-tooth edge 22 and therefore varies the amount of liquid which can enter the tube through the slot 25. For control purposes it is necessary only that the liquid level be maintained below the open top end of the tubes 10, since the tight fit of the sleeve permits liquid to enter the slot only above the saw-tooth edges 22. The sleeve is rotatable from a position in which each slot is virtually unobstructed to a position in which each slot is completely covered, thereby varying the effective area of each slot over the complete range.

It will, of course, be understood that the invention is not restricted to the saw-tooth configuration of the upper edges 22 illustrated in FIGS. 1 and 2. The upper edges may be sinuous in configuration, or crenellated. In its broadest aspect the invention contemplates a sleeve having upper edges of any configuration which will vary the height of the effective bottom edges of the slots above the tube sheet upon rotation of the sleeve. The invention is equally effective with tubes having inlet slots in their top portions or having ferrules with inlet slots.

We claim:
1. In a falling film heat exchanger having a plurality of vertically oriented tubes supported by top and bottom tube sheets, said tubes having extensions above the top tube sheet, inlet openings in said tubes above said top tube sheet for admission of liquid to be dried into the interior of said tubes, and means for supplying liquid to said inlet openings, the improvement which comprises liquid distribution control means acting to vary the height of the effective bottom edges of said inlet openings above said top tube sheet.

2. In a falling film heat exchanger having a plurality of vertically oriented tubes supported by top and bottom tube sheets and extending above the top tube sheet, a plurality of axially extending inlet slots in said tubes above said top tube sheet for admission of liquid to be dried into the interior of said tubes, and means for supplying liquid to said inlet slots, the improvement which comprises:
   a cylindrical sleeve disposed for rotatable adjustment about said inlet slots on each of said tubes;
   upper edges on said sleeve having a configuration which varies the height of the effective bottom edges of said inlet slots above said top tube sheet upon rotatable adjustment of said sleeve; and
   means to hold said sleeve in a desired position of adjustment during operation.

3. The apparatus claimed in claim 2, wherein said upper edges of said sleeve are angularly disposed relative to the axis of said tube.

4. The apparatus claimed in claim 2, wherein said upper edges of said sleeve are saw-tooth edges, the number of teeth being equal to the number of inlet slots.

5. The apparatus claimed in claim 2, wherein said upper edges of said sleeve are sinuous.

6. Liquid distribution control means for a vertical, tubular, internal falling film heat exchanger of the type having vertical tubes extending above an upper tube sheet with inlet openings in the top portions of said tubes, said control means comprising:
   a cylindrical sleeve adapted for a snug fit about the extending top portion of each tube, said sleeve having upper edges configured in such manner as to vary the axial position of the bottom edges of said openings upon rotation of said sleeve, whereby to regulate the amount of liquid which can be admitted through said inlet openings.

7. Liquid distribution control means as claimed in claim 6, wherein said sleeve is formed of metal having a spring-like action causing the sleeve to grip said top portion of said tube.

8. Liquid distribution control means as claimed in claim 6, wherein said sleeve is formed of elastomeric material and is of such diameter as to require a force fit over said top portion of said tube.

References Cited

UNITED STATES PATENTS

| | | | |
|---|---|---|---|
| 828,060 | 8/1906 | Schwager | 165—118 |
| 1,557,838 | 10/1925 | Hiller | 165—118 X |
| 2,089,945 | 8/1937 | Converse et al. | 23—103 |
| 2,519,618 | 8/1950 | Wilson et al. | |
| 3,087,533 | 4/1963 | Graumann et al. | 159—49 X |
| 1,914,700 | 6/1933 | Mitchum | 165—18 |

FOREIGN PATENTS 64,501  9/1892  Germany.

NORMAN YUDKOFF, *Primary Examiner.*

J. SOFER, *Assistant Examiner.*

U.S. Cl. X.R.

165—115